(No Model.) 2 Sheets—Sheet 1.

S. WING.
PHOTOGRAPHIC CAMERA.

No. 361,387. Patented Apr. 19, 1887.

Witnesses
J. Thomson Cross
J. W. Lord

Inventor
Simon Wing.
By his Attorney
A. G. Heylman (No Model.) 2 Sheets—Sheet 2.

S. WING.
PHOTOGRAPHIC CAMERA.

No. 361,387. Patented Apr. 19, 1887.

Witnesses
J Thomson Cross
J. W. Lowe

Inventor
Simon Wing.
By his Attorney
A. G. Heylmun

UNITED STATES PATENT OFFICE.

SIMON WING, OF BOSTON, MASSACHUSETTS.

PHOTOGRAPHIC CAMERA.

SPECIFICATION forming part of Letters Patent No. 361,387, dated April 19, 1887.

Application filed November 18, 1886. Serial No. 219,276. (No model.)

*To all whom it may concern:*

Be it known that I, SIMON WING, a citizen of the United States of America, residing at Boston, (Charlestown) in the county of Suffolk and State of Massachusetts, have invented a new and useful Improvement in Photographic Cameras, of which the following is a specification.

My invention has relation to improvements in photographic cameras, and the object is to provide an improved adjustable lens-holder, whereby the rays of light passing through the lens may be cast on the sensitized plate from any direction and still have the plate perpendicular. This object is accomplished by making the lens-holding end of the camera of a series of adjustable rectangular sliding frames arranged to carry the lens transversely, vertically, and diagonally, and by fixing the base of the lens-tube to a section of a sphere adapted to set and turn in a concave circular receptacle in the lens-frame of the camera.

My invention therefore consists in the novel construction of parts and their combination, as hereinafter described, and specially as the same is pointed out in the claims made hereto.

Figure 1:
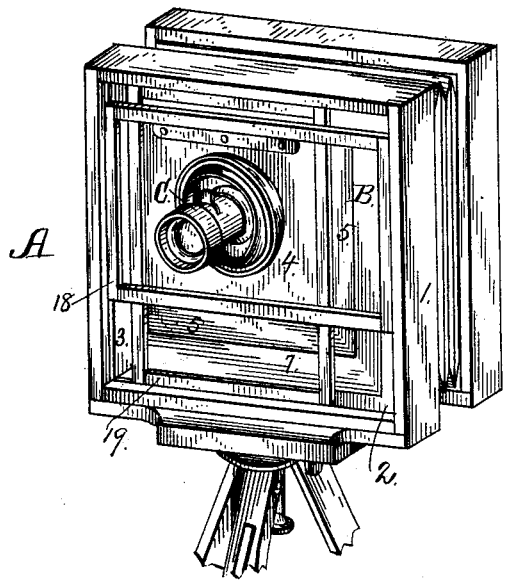
Figures 2, 3:
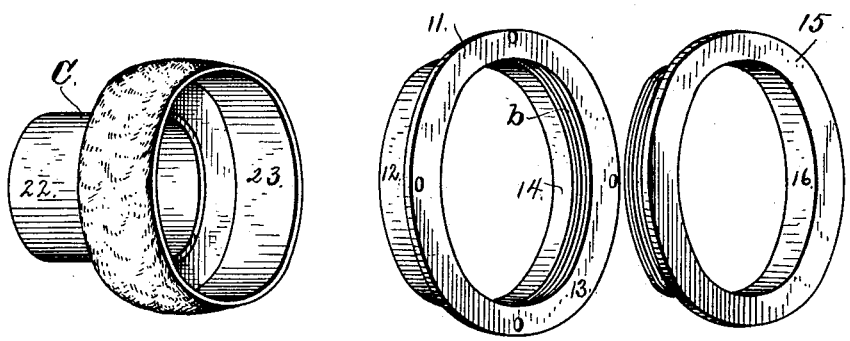
Figure 4:
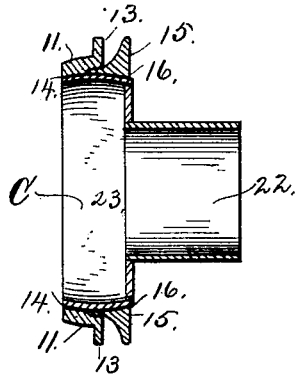
Figure 5:
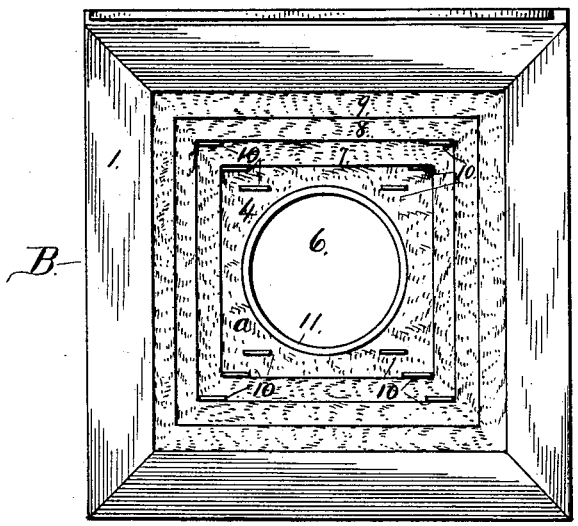

I have fully illustrated my invention in the accompanying drawings, forming a part of this specification, wherein Figure 1 is a perspective view of a photographic camera with my improvement attached. Fig. 2 is a perspective view of the lens-tube with convex circular base. Fig. 3 is a perspective of the socket and base. Fig. 4 is a longitudinal sectional view of the lens-tube and socket, and Fig. 5 is a reverse view of the lens-holder.

In the drawings the same parts are denoted by similar notations, and, reference being had thereto, the letter A designates the camera, which may be of any approved construction, wherein the opposite ends move on a common line. I have shown it as consisting of a dark box composed of vertical end frames connected by an extensible medium.

The letter B designates the lens-holder. This holder may consist of a rectangular frame, 1, detachably fitted in the frame of the box, usually by forming grooves on the sides and one end, which set over tongues or gains in the box, and thus making a light-tight connection. On the inner face of the frame 1 are flanges 2, which serve as seats for the bottom piece of the adjustable sections composing the lens-holder proper. In the inner side of the frame are formed grooves 3, which take the ends of the adjustable spring-frame, hereinafter described. The central and top section, 4, of the lens-holder consists of a rectangular piece of stuff having side flanges, 5, extended from its lower edges on each side, and in the center is a hole, 6, in which is seated the frame or socket ring which holds the section of a sphere. The other adjustable sections, 7, 8, and 9, consist of rectanglar frames, of thin material, arranged in succession one beneath the other, the uppermost being the smallest and the bottom one the largest, and all of the sections have black and soft textile material, *a*, cemented to the under faces, which gives the slide ease and prevents reflection. To limit the movements of each section in its relation to the adjacent section, and to carry the sections along in succession in the desired direction, on the under side of each are fixed small metal flanges 10, those on the section 4 being arranged with their outer edges to form the limits of a square, and those of the other sections being set in the angles of the opening of the frames, substantially as shown in Fig. 6 of the drawings.

The numeral 11 designates the lower part of the receptacle forming the seat for the lens-tube. This preferably consists of a metal ring having a depending flange, 12, and horizontal flange 13, to set over the edges of the hole in the lens-holder, and is secured thereto by screws let through the flange. The depending flange or ring is formed with a concave seat, 14, and in the upper part is provided with screw-threads *b*, to take the holding-ring 15. This holding-ring is threaded on its outer lower face to fit the threads in receptacle 11, and the inner face is concaved, as at 16, to set over the sphero-segmental ring of the lens-tube. In this seat and cap is secured the sphero-segmental end of the lens-tube C. This consists of the tube 22 to receive the lens or the adjustable section holding it, which is not shown, and a sphero-segmental ring, 23, to fit in the concave seat in the lens-holding end of the camera. The surface of the sphero-segment is covered with a black villous material, which excludes the light and gives ease to the movements of the lens-holding tube. These parts may be united in operative combination by setting the base on the tube in the seat in the frame of the lens-holder and then screwing on the cap. This construction of the lens-holder gives a universality to the adjustment of the lens, since by the ball-and-socket connection the tube may be turned to any angle and receive the rays desired.

The adjustable sections of the lens-holder are held in operative arrangement in the frame by two rectangular spring-metal frames, 18 19, transversely disposed with their ends seated to slide in the grooves 3 of the frame, and with the rectangular block of the central section held in the square formed by the intersection of the spring-metal frames. It will thus be seen that the lens-tube may be moved in these frames vertically, laterally, and diagonally, which movements, in connection with the movements of the lens-tube in the ring and socket, give all possible direction to the tube. This arrangement and construction give the lens a wide range not unlike the visual scope of the human eye. The lens can also be shoved in the sliding frames to any desired point within the outside frame.

The movement of the tube by means of the ball-and-socket connection enables the operator to direct it in any direction, while the plate remains perpendicular, and the sliding frames allow the light passing through the lens to be directed to the most desirable part of the plate. I thereby am enabled to make the back of the camera upright, square, and rigid to the bed of the box, as it should be, so that when the camera is accurately leveled, which is done by means of spirit-levels attached to the camera, the plate must be perpendicular—a position necessary when photographing perpendicular objects to avoid distortion or the appearance of tipping and leaning in the picture.

This invention is most useful in photographing objects not on a level with the camera and high buildings at short distances. The camera in such instances can be leveled and the lens pointed toward the center of the object and the field of the lens adjusted on the plate as desired, the lens being adjusted by the hand of the operator while his eye is watching the image on the perpendicular plate, the springs holding the lens wherever it is set.

The lens-holder can be permanently attached to a camera, or can be made detachable and the camera used without it for work not requiring it.

In using clusters of lenses for making several pictures on one plate all at once, it is necessary to have all parts of the plate equidistant from the lenses, or the pictures will not come in focus together. A camera with a rigid upright back is best adapted for this purpose, and by attaching this lens-holder to the front of the camera it renders it equally useful for viewing and other work. Therefore my invention attached to ordinary stiff-backed cameras greatly increases their practical usefulness without rendering them unfit for other work.

I do not limit myself to the specific construction and arrangement of parts as described in this specification, since the invention consists in the application and adaptation of a lens-holder with a ball-and-socket connection to a camera irrespective of the character and construction of the camera, and in connecting such a lens-holder to the camera so as to be shifted in all directions across the end of the camera.

I am aware that a lens-holder has been made wherein the lens and its cell are mounted on an adjustable mounting within a rotary carrier-ring to give the lens vertical and lateral adjustability, and I make no claim to such construction.

I am also aware that a camera has been made having a socket fastened to the outside containing within it a girdle or half-zone of brass, into which the mounted lens is fitted, the lens-tube being secured to move vertically on its axis by means of a pinion and key. My improvements consist in making a socket and end of the lens-holder fitted thereto a segment of a circle taken on planes equidistant from the diameter, thus giving to the tube the function of universal direction and dispensing with the pinion and key.

What I claim as my invention, and desire to secure by Letters Patent, is—

1. The combination, with a camera, of a lens-holder seated in the lens-holder end of the camera by a ball-and-socket connection consisting of a socket in the camera and end piece fitted to the socket formed of segments of a circle taken on planes equidistant from the diameter, whereby the lens-tube can be turned in any direction, substantially as described.

2. The combination, with a camera, of a lens-holder seated in the lens-holder end of the camera by a ball-and-socket connection and arranged to be shifted across the end of the camera, substantially as described.

3. The combination, with a camera, of a lens-holder formed with a sphero-segmental base and a number of shifting frames to close the end of the camera, and one of said frames carrying the lens-tube with its sphero-segmental base adjustably seated therein, substantially as described.

4. The combination, with the camera, of a number of shifting frames to close the end of the camera, and arranged one above the other, and a lens-tube seated in the outer shifting frame by a ball-and-socket connection, substantially as described.

5. The combination, with a camera, of a number of shifting frames to close the end of the camera, and arranged one above the other, a lens-tube seated in the outer shifting frame, and movable guiding-frames arranged transversely to each other, with the projecting end of the outer shifting frame seated in the square formed by their intersection, substantially as described.

6. The combination, with a camera, of a lens holder or tube provided with a base-ring formed convex in cross-section and a separable concaved ring-socket to secure it to the camera, said base-ring and ring-socket consisting of segments of a circle taken on planes equidistant from the diameter, whereby the lens-tube can be turned in any direction, substantially as described.

7. The combination, with a camera provided with a concaved ring-seat, of a lens holder or tube having a base formed convex in cross-section to set in the concaved ring-seat, and a clamping-ring concaved in its inner surface to set over the base of the lens-tube and threaded exteriorly to engage with threads on the interior of the concaved ring-seat, substantially as described.

8. The combination, with a camera provided with a detachable concaved ring-seat, of a lens holder or tube having a base formed convex in cross-section and provided with a villous covering to set in the concave ring-seat, and a clamping-ring concaved in its inner face to set over the base of the lens-tube, and means, substantially as described, for uniting it to the concave ring-seat, substantially as specified.

9. The combination, with a camera, of a lens-holder composed of a number of rectangular frames arranged one upon the other, rectangular spring-metal frames fitted to slide in grooves in the lens-holder frame, and arranged across each other with the top of the uppermost of the first-named rectangular frames arranged in the square in the frame formed by their intersection, and a lens-holder tube having a convex ring-base seated in a concave ring-seat, substantially as described.

In witness whereof I have hereunto set my hand in the presence of two attesting witnesses.

SIMON WING.

Attest:
ALFRED L. MOODY,
LESTER E. MANSON.